United States Patent
Weiss

(10) Patent No.: US 11,890,838 B2
(45) Date of Patent: Feb. 6, 2024

(54) WINDOW AIR CONDITIONER INSULATION KIT AND METHOD OF INSTALLATION

(71) Applicant: Dbt holdings LLC, Pittsburgh, PA (US)

(72) Inventor: Shraga Weiss, Pittsburgh, PA (US)

(*) Notice: Subject to any disclaimer, the term of this patent is extended or adjusted under 35 U.S.C. 154(b) by 506 days.

(21) Appl. No.: 17/163,966

(22) Filed: Feb. 1, 2021

(65) Prior Publication Data
US 2021/0237405 A1 Aug. 5, 2021

Related U.S. Application Data

(60) Provisional application No. 62/967,699, filed on Jan. 30, 2020.

(51) Int. Cl.
| | |
|---|---|
| *F24F 1/031* | (2019.01) |
| *B32B 27/06* | (2006.01) |
| *B32B 7/12* | (2006.01) |
| *B32B 3/02* | (2006.01) |
| *B32B 7/06* | (2019.01) |
| *F24F 13/20* | (2006.01) |

(52) U.S. Cl.
CPC .............. *B32B 27/065* (2013.01); *B32B 3/02* (2013.01); *B32B 7/06* (2013.01); *B32B 7/12* (2013.01); *F24F 1/031* (2019.02); *F24F 13/20* (2013.01); *B32B 2307/304* (2013.01); *B32B 2509/00* (2013.01); *F24F 2221/20* (2013.01)

(58) Field of Classification Search
CPC .... B32B 3/02; B32B 7/06; B32B 7/12; B32B 27/065; B32B 2307/304; B32B 2509/00; B32B 2509/10; F24F 1/031; F24F 13/20; F24F 2221/20
See application file for complete search history.

(56) References Cited

U.S. PATENT DOCUMENTS

| | | | |
|---|---|---|---|
| 3,465,539 A | 9/1969 | Smith | |
| 10,429,094 B2 * | 10/2019 | Mavrommatis | ......... F24F 1/027 |
| 2007/0163197 A1 | 7/2007 | Payne et al. | |
| 2011/0008629 A1 * | 1/2011 | Davidson | ................ B32B 5/245 |
| | | | 156/60 |

FOREIGN PATENT DOCUMENTS

| | | |
|---|---|---|
| WO | 2005047779 A1 | 5/2005 |
| WO | 2010151717 A1 | 12/2010 |

* cited by examiner

*Primary Examiner* — Jonathan Bradford

(57) ABSTRACT

A window air conditioner insulation kit to be used with a window air conditioner mounted in a window including a left side panel to be pressed in a first opening between a side of the air conditioner and a left side jamb of the window. A right side panel to be pressed in a second opening between a right side of the air conditioner and a right side jamb of the window. A top panel to extend and be pressed in a third opening between the left side jamb and the right side jamb. The top panel having an upper flap, a first side flap, a second side flap and a central flap which extend down and over an upper section of the first side flap, an upper section of the second side flap and onto the top of the AC.

16 Claims, 5 Drawing Sheets

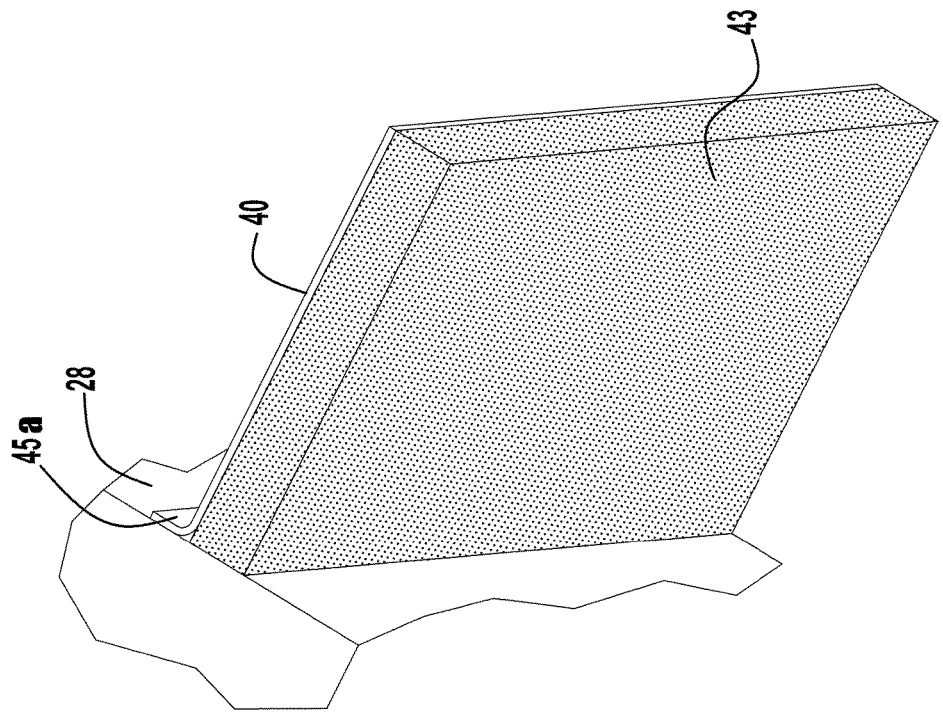
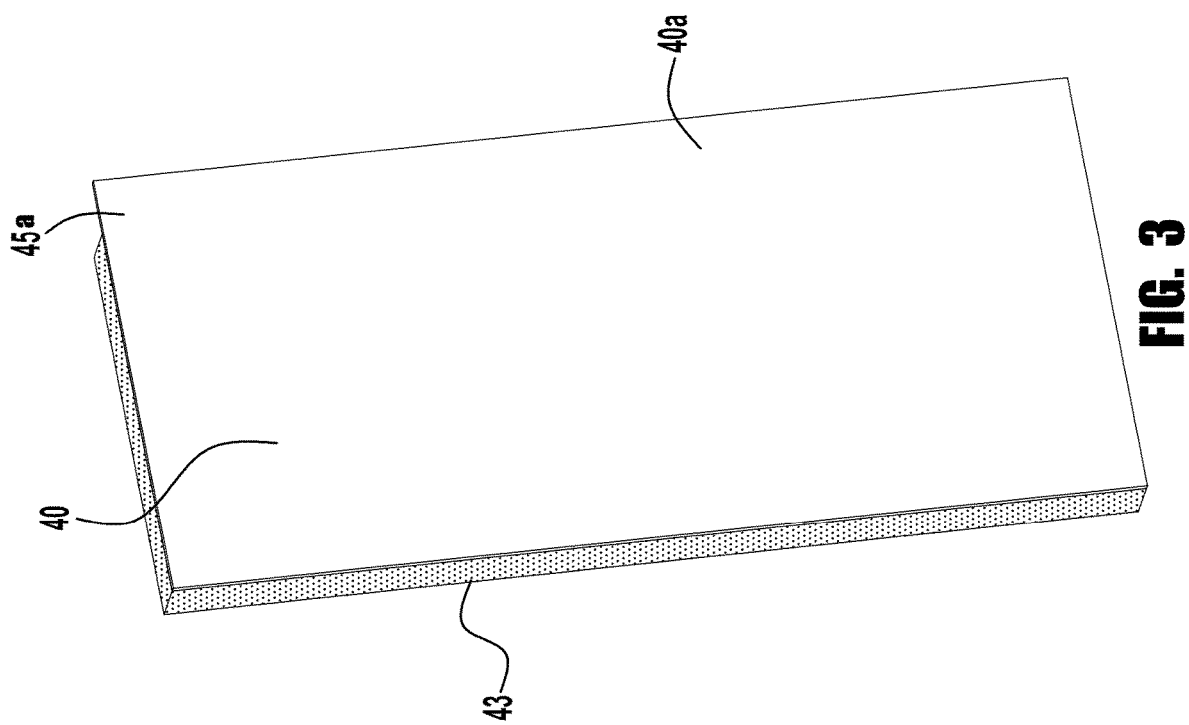

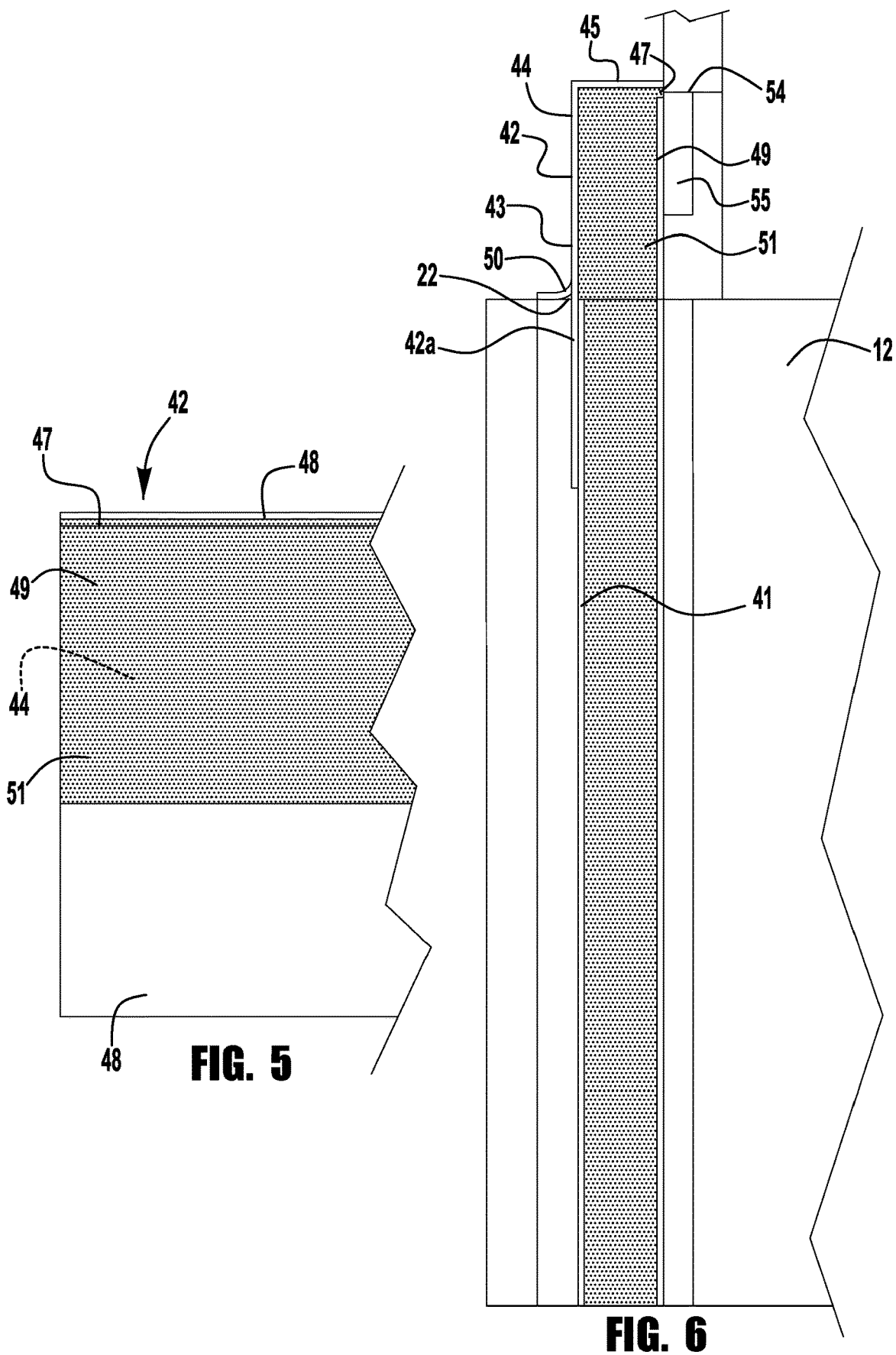

WINDOW AIR CONDITIONER INSULATION KIT AND METHOD OF INSTALLATION

CROSS-REFERENCE TO RELATED APPLICATION

This application claims the benefit of priority of U.S. Provisional Application with Ser. No. 62/967,699 filed Jan. 30, 2020.

FIELD OF THE INVENTION

The invention relates a window air conditioner (AC) insulation kit and method of installation of said kit around a window AC unit.

BACKGROUND OF THE INVENTION

Window air conditioner units fit within an opening of a window between the left and right jambs of the window, below the lower sash of the window and rest on the sill of the window. The left and right openings vary in dimension as the width of the window AC vary and the width of windows vary. Accordion fillers are available to fill in this variable width opening but lack effective insulation properties. Furthermore, these accordion fillers do not extend over the top of the window AC thereby leaving openings that reduce the effectiveness of the AC.

SUMMARY OF THE INVENTION

According to the present invention, a window air conditioner insulation kit adapted to be used in conjunction with a window air conditioner mounted in a window including a left side panel configured to be pressed in a first opening between a left side of the window air conditioner and a left side jamb of the window when the air conditioner is mounted in the window. A right side panel configured to be pressed in a second opening between a right side of the window air conditioner and a right side jamb of the window. A top panel having an upper primary portion configured to extend and be pressed in a third opening between the left side jamb and the right side jamb when the air conditioner is mounted in the window. The top panel having an upper flap that extends perpendicular and outward from a front surface of the top panel. The top panel having a first side flap, a second side flap and a central flap that are formed integral with the upper primary portion of the top panel and which extend down from the upper primary portion and over an upper section of the first side flap an upper section of the second side flap and onto the top of the AC.

According to another embodiment of the present invention, a window air conditioner insulation kit adapted to be used in conjunction with a window air conditioner mounted in a window, comprises: a left side panel configured to be pressed in a first opening between a left side of the window air conditioner and a left side jamb of the window when the air conditioner is mounted in the window; a right side panel configured to be pressed in a second opening between a right side of the window air conditioner and a right side jamb of the window when the air conditioner is mounted in the window; and both the left side panel and the right side panel having a front surface formed of a flexible sheet of plastic and a rear surface formed of a sheet of compressible rubber foam.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

FIG. 3 shows a perspective view of a side insulation panel having a flap provided to be inserted between an exemplary window AC and an opening in a window.

FIG. 4 shows a perspective view of. one of the side insulation panels installed between and a window AC and the window with the flap against the AC to close and insulate the opening between the AC and the window.

FIG. 5 shows a rear partial view an exemplary top portion having a top flap and a bottom flap adapted to be disposed between the tope surface of the AC and the window.

FIG. 6 shows a side view of an exemplary side portion, left or right, having a insulation panel, a cover coupled to a front face of the insulation panel and a side portion fastener configured proximal to the top of the side portion and configured to detachably attach with the top flap fastener of the top flap.

DETAILED DESCRIPTION OF THE ILLUSTRATED EMBODIMENTS

Figure 1:
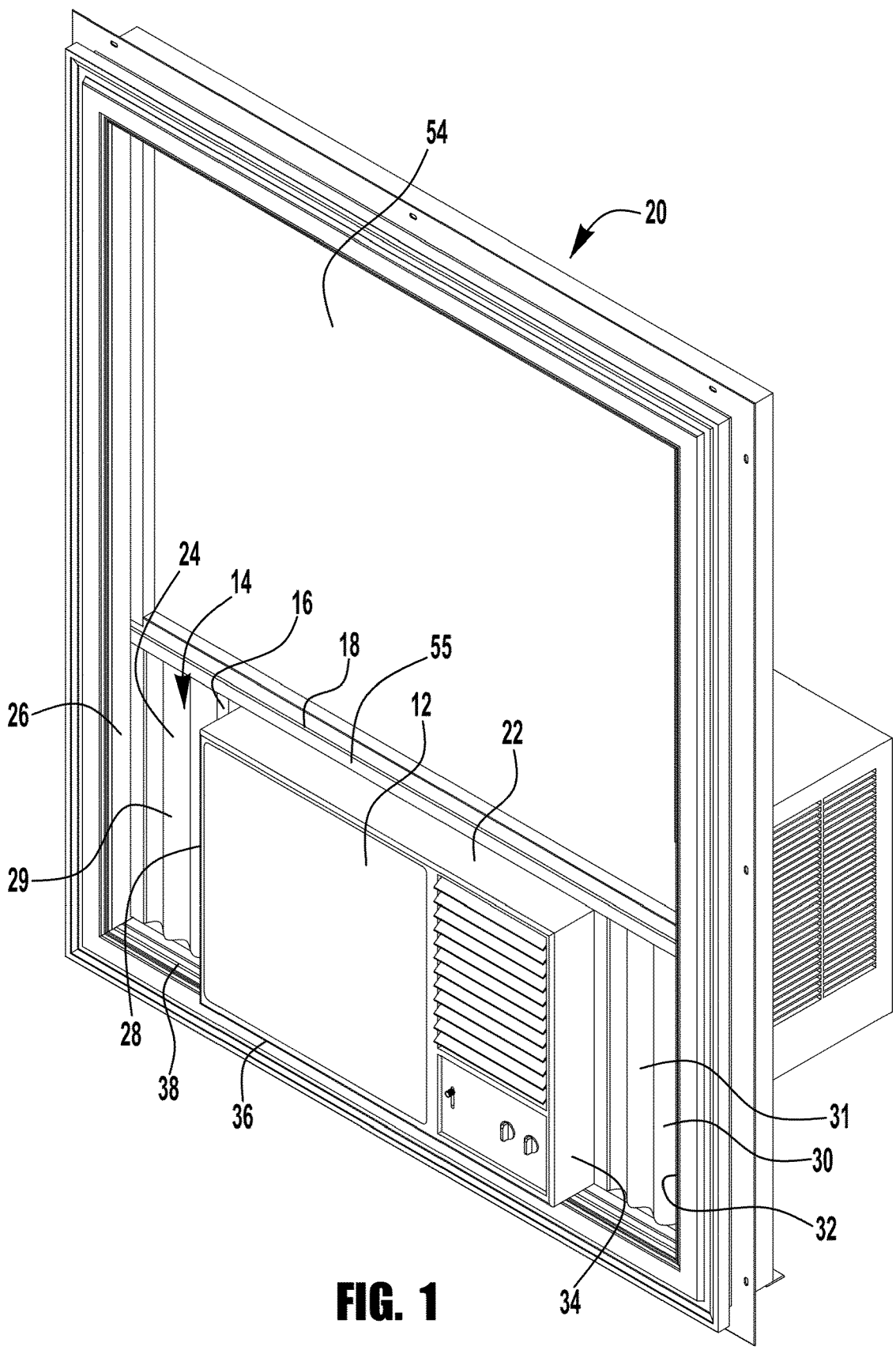
FIG. 1 shows a front perspective view of a window air conditioner (AC) in an opening of a window wherein there is a top opening between the window and the top of the AC, a left side opening between the left side jam and the left side of the AC and a right side opening between the right side jam and the right side of the AC.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 7, there is illustrated an exemplary window AC insulation kit 10 used in conjunction with a window air conditioner (AC) 12. The AC is configured in a window opening 14, wherein there is a top opening 16 between the lower sash 18 of the window 20 and the top 22 of the AC, a left side opening 24 between the left side jamb 26 and the left side 28 of the AC and a right side opening 30 between the right side jamb 32 and the right side 34 of the AC.

Typically, the left side opening 24 between the left side jamb 26 and the left side 28 of the AC is filled an accordion side panel 29 that can be adjusted to fill the opening 24. Similarly, the right side opening 30 between the right side jamb 32 and the right side 34 of the AC is filled an accordion side panel 31 that can be adjusted to fill the opening 30.

The bottom 36 of the AC 12 is resting on and supported by the sill 38 of the window 20.

While the openings 24 and 30 between the window AC 12 and the window opening 14 are closed by accordion side panels 29 and 31, the accordion side panels are prone to leak air between the front and rear sides of the AC and thereby reduce the efficiency of the cooling. The result is that the cost of cooling the room that is being cooled by AC is increased.

The window AC insulation kit 10 of the present invention overcomes this problem by providing sufficient sealing and insulating between the top 22, the left side 28, the right side 34 and an installation bar holds the AC in the window and that extends across the width of the window. The installation bar is located below the window 20. In addition, the window AC insulation kit 10 provides an attractive cover between the top 22, the left side 28, and the right side 34 of the window AC and just below the window 20. An important aspect of the present invention is that the window AC insulation kit 10 can be installed on an AC that is already mounted in a window without the need to remove any of the mounting portions already in place.

The window AC insulation kit 10 includes a left panel 40 configured to be pressed between the left side 28 of the window AC 12 and the left side jamb 26 of the window 20. Further, the window AC insulation kit 10 includes a right panel 41 configured to be pressed between the right side 34 of the window AC 12 and the right side jamb 32 of the window 20. Moreover, a top panel 42 is installed to cover the installation bar and extend over the top 22 of the AC.

Figure 2:
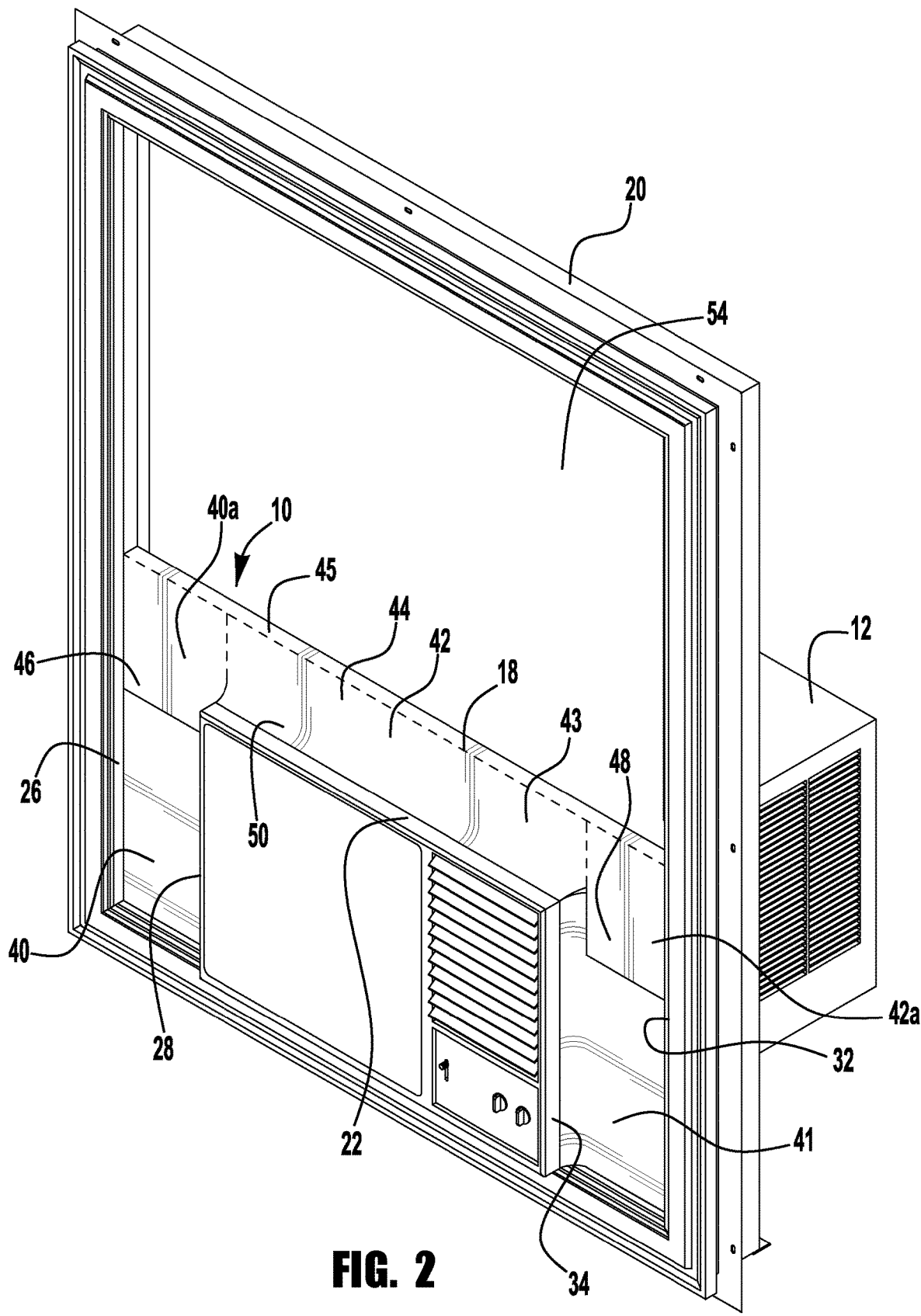
FIG. 2 shows a front perspective view of an AC configured in a window and an exemplary window AC insulation kit configured around the AC unit to close and insulate the openings between the AC and the window.

As illustrated in FIG. 2, the top panel 42 has an upper primary portion 44 which extends between the left side jamb 26 and the right side jamb 32. The top panel 42 has an upper flap 45 that extends perpendicular and outward from the front surface 43 of the top panel 42 and when the top panel is installed, curls over the installation bar 55 disposed below the lower sash 18.

The top panel 42 has a first side flap 46, a second side flap 48 and a central flap 50 that are formed integral with upper primary portion 44 and extend down from the upper primary portion 44 towards the sill 38 of the window 20.

The first side flap 46, the second side flap 48 and the central flap 50 are configured to couple with the upper portions 40a and 42a of the side panels 40 and 41, respectively, and to the top surface 22 of the AC. The side flaps 46 and 48 and central flap 50 can include a stripe of adhesive on the back side thereof to form a fastener configured along the back side of the three top flaps 46, 48 and 50. Each stripe of fastener can be covered with a removably strip of material, such as for example, a strip of paper.

As shown in FIGS. 3 and 4 an exemplary left side panel 40 has a front surface 40a formed of a flexible sheet of plastic, such as vinyl. The rear surface 43 of the exemplary left side panel 40 is formed of a sheet of compressible rubber foam. The sheet of rubber foam is adhered to the flexible sheet of plastic by any desired conventional means such as glue. The flexible sheet 40a of plastic extends past the sheet of compressible rubber foam to form a flap 45a that is bent away from the rubber foam when the panel 40 is installed. The surface of the flap 45a that is bent away from the rubber foam 43 includes a stripe of adhesive. The left panel 40 is configured so that the flap 45a is pressed between the left side 28 of the window AC 12 and the left side jamb 26 of the window 20. As shown in FIG. 4, the adhesive strip on the surface of the flap 45a is secured to the left side 28 of the window AC 12.

Note that the right side panel may have all the same features as the left side panel.

Referring to FIG. 5, there is shown a rear view of a section of the top panel 42 where the second side flap 48 as shown in FIG. 2 are formed integral with upper primary portion 44. An edge 47 of foam rubber projects outward from the rear surface 49 of the sheet of compressible foam rubber 51 and covers the installation bar 55 below the window 54, as shown in FIG. 6, when the top panel 42 is in place and secured by the side flaps 46 and 48 and central flap 50 to the side panels 40 and 42, respectively, and to the top 22 of the AC.

Referring to FIG. 6, there is illustrated a side view of the right side panel installed. The top panel 42 is mounted below the glass panel 54 of the window 20 so that the upper primary portion 44 extends between the left side jamb 26 and the right side jamb 32. The top panel 42 has an upper flap 45 that extends perpendicular and outward from the front surface 43 of the top panel 42 and curls over the foam rubber 51 and covers the installation bar 55.

The top panel 42 can include a stripe of adhesive on the back side thereof to form a fastener configured along the back side of the three top flaps 46, 48 and 50, as seen in FIG. 2. Each stripe of fastener can be covered with a removably strip of material, such as for example, a strip of paper. When installed, the flap 42a overlies the side panel 41 and can be secured thereto by the adhesive.

Further, central flap 50 can be secured by the stripe of adhesive to the top 22 of the AC.

Figure 7:
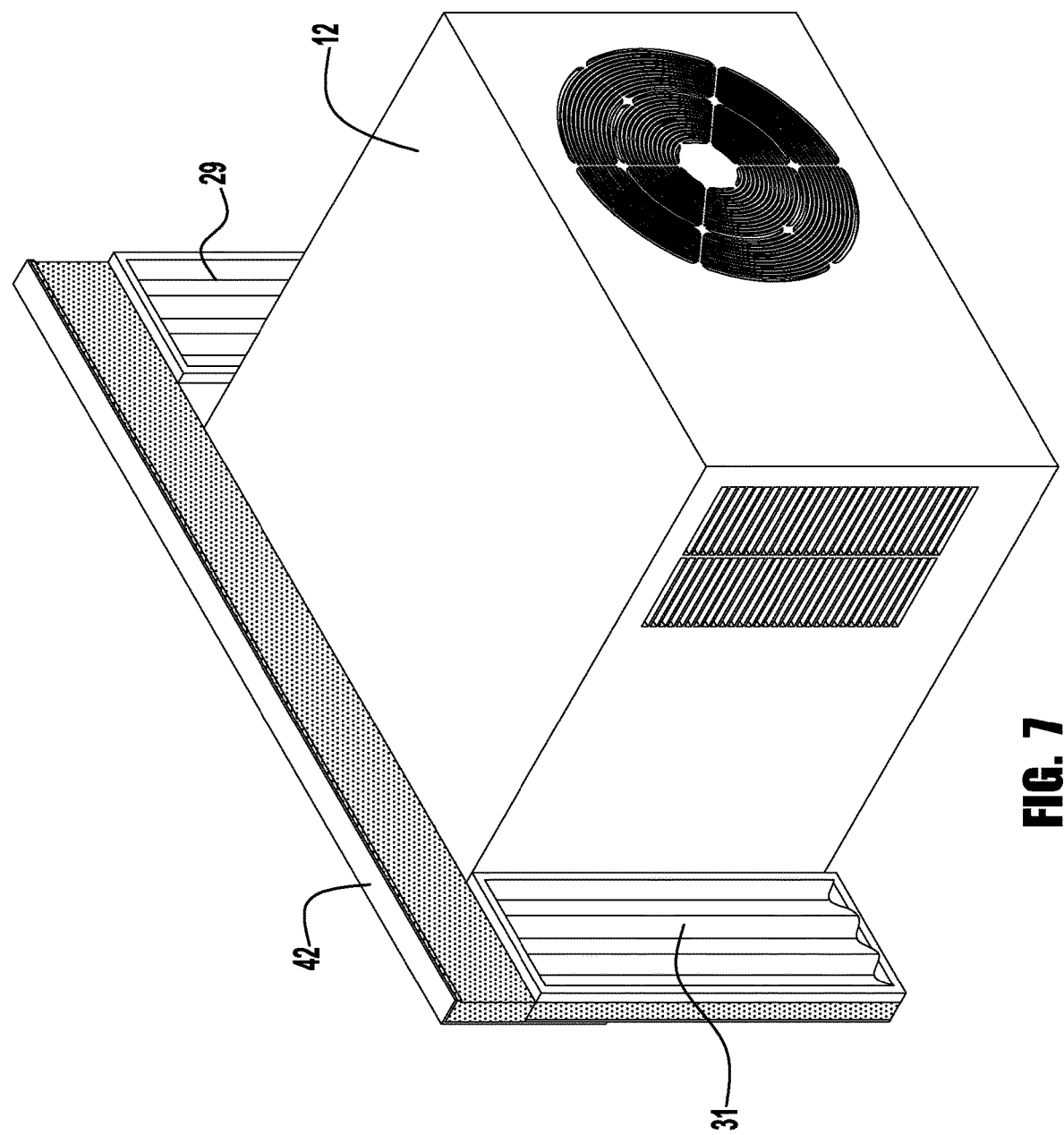
FIG. 7 shows a perspective rear view of a window AC insulation kit having side insulation panels and a top insulation panel mounted between the window and the AC.

As shown in FIG. 7, an exemplary top portion 42 extends between the left side jamb 26 and the right side jamb 32. Note that when the window AC insulation kit 10 is installed, the accordion side panels 29 and 31 remain in place.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A window air conditioner insulation kit adapted to be used in conjunction with a window air conditioner mounted in a window, comprising:
 a left side panel configured to be pressed in a first opening between a left side of the window air conditioner and a left side jamb of the window when the air conditioner is mounted in the window;

a right side panel configured to be pressed in a second opening between a right side of the window air conditioner and a right side jamb of the window when the air conditioner is mounted in the window;

a top panel having an upper primary portion configured to extend and be pressed in a third opening between the left side jamb and the right side jamb when the air conditioner is mounted in the window;

the top panel having an upper flap that extends perpendicular and outward from a front surface of the top panel when the top panel is installed to the air conditioner mounted in the window; and the top panel having a first side flap, a second side flap and a central flap that are formed integral with the upper primary portion of the top panel and wherein the first side flap extends over an upper section of the left side panel, the second side flap extends over an upper section of the right side panel and the central flap extends onto the top of the window air conditioner.

2. The window air conditioner insulation kit of claim 1 wherein the first side flap, and the second side flap are configured to be detachably connected to the upper section of the left and right side panels, respectively.

3. The window air conditioner insulation kit of claim 1 wherein the upper flap curls over a lower sash of the window when the top panel is installed on the window air conditioner mounted in the window.

4. The window air conditioner insulation kit of claim 2 wherein the first and second side flaps include a detachable fastener on an inner surface configured to detachably attach to the upper section of the left and right side panels, respectively.

5. The window air conditioner insulation kit of claim 4 wherein the detachable fastener is a stripe of glue applied along the back side of the first flap, second flap, and central flap.

6. The window air conditioner insulation kit of claim 5 wherein the stripe of fastener can be covered with a removable strip of material.

7. The window air conditioner insulation kit of claim 5 wherein the stripe of fastener can be covered with a removable strip of paper.

8. The window air conditioner insulation kit of claim 1 wherein the left side panel has a front surface formed of a flexible sheet of plastic and a rear surface formed of a sheet of compressible rubber foam.

9. The window air conditioner insulation kit of claim 8 wherein the right side panel has a front surface formed of a flexible sheet of plastic and a rear surface formed of a sheet of compressible rubber foam.

10. The window air conditioner insulation kit of claim 9 wherein the front surface of the right side panel and the front surface of the left side panel is formed of a flexible sheet of vinyl.

11. The window air conditioner insulation kit of claim 10 wherein the first flap on the left side panel and the second flap on the right side panel are provided with a stripe of adhesive to attach the left and right side panels to the left and right sides of the window air conditioner.

12. The window air conditioner insulation kit of claim 10 wherein the sheet of compressible rubber foam is adhered to both the left side sheets of foam and plastic and the right side sheets of foam and plastic.

13. The window air conditioner insulation kit of claim 12 wherein the left side opening between the left side jamb and the left side of the window air conditioner is filled with a left accordion side panel that can be adjusted to fill the opening.

14. The window air conditioner insulation kit of claim 13 wherein the right side opening between the right side jamb and the right side of the window air conditioner is filled a right accordion side panel that can be adjusted to fill the opening.

15. The window air conditioner insulation kit of claim 13 wherein an edge of foam rubber projects outward from the rear surface of the sheet of compressible foam rubber and engages the window when the top panel is in place.

16. A window air conditioner insulation kit adapted to be used in conjunction with a window air conditioner mounted in a window, comprising:

a left side panel configured to be pressed in a first opening between a left side of the window air conditioner and a left side jamb of the window when the air conditioner is mounted in the window;

a right side panel configured to be pressed in a second opening between a right side of the window air conditioner and a right side jamb of the window when the air conditioner is mounted in the window; and both the left side panel and the right side panel having a front surface formed of a flexible sheet of plastic and a rear surface formed of a sheet of compressible rubber foam and wherein the flexible sheet of plastic of both the left side panel and the right side panel extends past the sheet of compressible rubber foam on the rear surface to form first and second flaps that are adapted to being bent away from the sheet of compressible rubber foam and secured to one side of the window air conditioner when the left and right panels are installed.

* * * * *